United States Patent
Lefevere et al.

(10) Patent No.: US 7,469,059 B1
(45) Date of Patent: Dec. 23, 2008

(54) REORGANIZATION OF RAW IMAGE DATA FOR PROCESSING

(75) Inventors: Francois-Marie Lefevere, Mountain View, CA (US); Marin Saric, Palo Alto, CA (US); Dan S. Bloomberg, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 577 days.

(21) Appl. No.: 11/015,980

(22) Filed: Dec. 17, 2004

(51) Int. Cl.
*G06K 9/00* (2006.01)

(52) U.S. Cl. .................. 382/166; 382/162; 382/232; 382/233

(58) Field of Classification Search .......... 382/232, 382/165, 162, 240, 166, 233, 269, 289, 249, 382/261; 348/222.1; 375/340, E7.204; 399/227, 399/226; 235/494, 469, 470; 358/3.03, 3.2, 358/3.27, 426.04, 534, 448; 345/634; 715/838, 715/209
See application file for complete search history.

(56) References Cited

U.S. PATENT DOCUMENTS

| | | | | |
|---|---|---|---|---|
| 5,765,176 A | * | 6/1998 | Bloomberg | 715/209 |
| 5,825,830 A | * | 10/1998 | Kopf | 375/340 |
| 6,633,679 B1 | * | 10/2003 | Yfantis | 382/240 |
| 6,760,127 B1 | * | 7/2004 | Shin et al. | 358/3.03 |
| 6,961,085 B2 | * | 11/2005 | Sasaki | 348/222.1 |
| 7,024,138 B2 | * | 4/2006 | Ikeda et al. | 399/227 |
| 7,266,250 B2 | * | 9/2007 | Bloomberg et al. | 382/269 |

OTHER PUBLICATIONS

Zhang et al., "Fractal Color Image Compression Using Vector Distortion Measure", IEEE, vol. 3, Oct. 1995, pp. 276-279.*

* cited by examiner

*Primary Examiner*—Anh Hong Do
(74) *Attorney, Agent, or Firm*—Fish & Richardson P.C.

(57) ABSTRACT

Systems and methods for reorganizing raw image data captured by a camera for improved image processing are disclosed. The method generally includes separately compressing each color component, e.g., RGB, of raw grayscale image data to generate a reorganized grayscale data output file by a first processor, and performing color decoding to generate a color image output by a second processor. The raw grayscale image data may be that of an image of a target captured by a digital camera in an image capturing system. The second processor is separate from the first processor that records the raw grayscale image data of the image captured and may be physically external to the camera. The raw grayscale image data may be a 2N×2N array and the reorganized grayscale data output includes 4 N×N color-specific arrays where N is a factor of 8.

19 Claims, 3 Drawing Sheets

| R | G | R | G | R | G | R | G | R | G | R | G | R | G |
|---|---|---|---|---|---|---|---|---|---|---|---|---|---|
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |
| R | G | R | G | R | G | R | G | R | G | R | G | R | G |
| G | B | G | B | G | B | G | B | G | B | G | B | G | B |

FIG. 1

REORGANIZATION OF RAW IMAGE DATA FOR PROCESSING

BACKGROUND OF THE INVENTION

1. Field of the Invention

The present invention relates generally to image data processing. More specifically, systems and methods for reorganization of raw image data captured by a camera for improved image processing are disclosed.

2. Description of Related Art

Digital cameras are often employed to capture and record images in electronic form and output color images compressed using JPEG (Joint Photographic Experts Group) compression. However, JPEG applies heavy compression to the color data which can lead to issues with the quality of the resulting output color image and greatly limits any editing that can be satisfactorily performed on the image. In addition, any large moves to tone and/or color may exaggerate the 8-by-8-pixel blocks that form the foundation of JPEG compression. While some cameras allow the setting of various parameters (e.g., color space, sharpness value, tone curve and/or contrast setting) for the conversion of raw data captured by the camera's sensor to the output JPEG image, such adjustment of parameters is time consuming and thus generally impractical to employ on a per-shot basis.

Another issue with the compression performed by the camera is that many cameras can capture at least 12 bits, or 4096 shades, of tonal information per pixel. In contrast, the JPEG format is limited to 8 bits per channel per pixel. Thus, the built-in raw converter in the camera compresses or throws away a large amount of the captured data that cannot be recovered and thus cannot be utilized in the manipulation of the output image or data.

The capturing and recording of images in electronic form and outputting of compressed JPEG images may be employed in various applications. One exemplary application is the scanning of books, magazines, and/or other printed material into digital form. Such scanning of printed material has become more common with the advent of improved imaging, storage and distribution techniques. The conversion of printed material into electronic form allows institutions such as libraries, universities, bookstores, and private enterprises to reduce the cost of storage, facilitate remote access, enable simultaneous access by multiple users, facilitate search and retrieval of information, and/or protect information in rare or out-of-print works from loss or destruction. After imaging the contents of printed material, the recorded image can then be manipulated or otherwise processed. Digitally recorded bound documents can be de-warped, reformatted, supplemented with additional information, compressed, and/or processed with optical character recognition (OCR) software, and indexed to facilitate electronic search.

What is needed is a system and method for processing image data to allow greater flexibility and better results in subsequent image manipulation or editing.

SUMMARY OF THE INVENTION

Systems and methods for reorganization of raw image data captured by a camera for improved image processing are disclosed. It should be appreciated that the present invention can be implemented in numerous ways, including as a process, an apparatus, a system, a device, or a method. Several inventive embodiments of the present invention are described below.

Systems and methods for reorganizing raw image data captured by a camera for improved image processing are disclosed. The method generally includes separately compressing each color component, e.g., RGB, of raw grayscale image data to generate a reorganized grayscale data output file by a first processor, outputting the reorganized output file to a second processor, and performing color decoding to generate a color image output by the second processor. The raw grayscale image data may be that of an image of a target captured by a digital camera in an image capturing system. The second processor is separate from the first processor that records the raw grayscale image data of the image captured and may be physically external to the camera. The reorganized grayscale data output file may be in a reorganized pattern of an 16×16 array, the 16×16 array being composed of 2×2 arrays of 8×8 embedded color-specific array. The raw grayscale image data can be a 2N×2N array and the reorganized grayscale data output may include 4 N×N arrays where N is a factor of 8. Alternatively, the reorganized grayscale data output file may include four separate grayscale data files.

The second processor may also perform additional image processing tasks such as white balance, colorimetric rendering, gamma correction, noise reduction, antialiasing, and/or sharpening. The reorganized grayscale data output file may be in a reorganized pattern of an 16×16 array, the 16×16 array being composed of 2×2 arrays of 8×8 embedded color-specific array. The raw grayscale image data may be in a first two-dimensional spatial array pattern and the reorganized grayscale data output file may be in a second two-dimensional spatial array pattern that segregates each color component. Each element of raw grayscale image data can be associated with a color component and corresponds to a respective element in the reorganized grayscale data output file according to the color component of the element and according to its respective position within the raw grayscale image data. In one example, the raw grayscale image data is in a Bayer color filter array pattern and the reorganized grayscale data output file is in a special raw format that can be quickly generated by the camera with some compression such that the output data file is at least somewhat compressed but without serious JPEG artifacts. The reorganized grayscale data output file can be subsequently used in a demosaicing operation that interpolates and generates a full resolution RGB type image.

A system for processing raw grayscale image data generally includes a digital camera configured to capture an image of a target and having a first processor internal thereto configured to record the raw grayscale image data of the image, the first processor being further configured to compress each color component of the raw grayscale image data separately to generate a reorganized grayscale data output file, and a second processor different from the first processor configured to perform color decoding to generate a color image output.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

FIG. 1 illustrates a Bayer color filter array used by digital cameras.

DESCRIPTION OF SPECIFIC EMBODIMENTS

Figure 2:
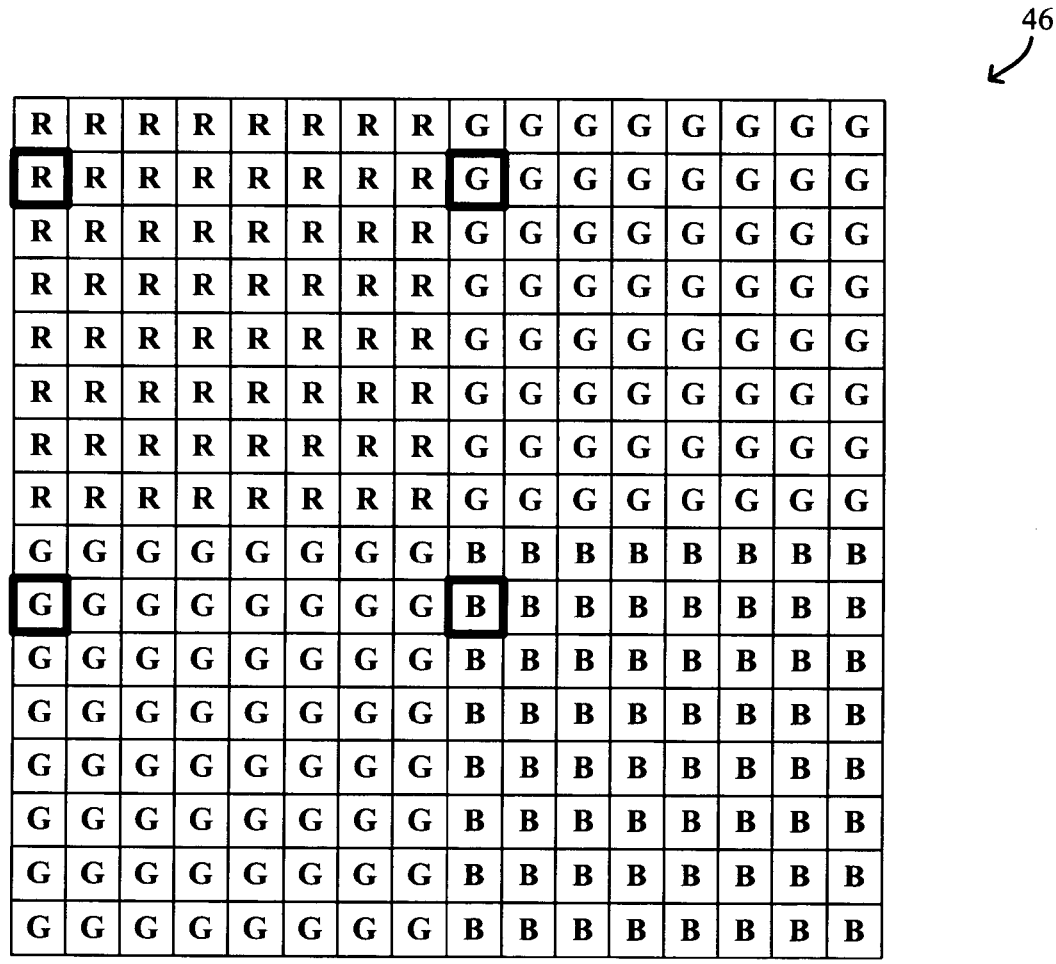
FIG. 2 illustrates a suitable reorganization of the raw grayscale RGB grayscale data from data generated by the Bayer color filtering array of FIG. 1.

Systems and methods for reorganization of raw image data captured by a camera for improved image processing are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Digital camera generally have sensors that capture raw data in grayscale. A raw file is a record of the raw (unprocessed) data in grayscale captured by the sensor. Typical conventional cameras utilize a built-in converter to convert the grayscale raw data to color images compressed using JPEG compression. In particular, digital cameras often use an image sensor composed of a two-dimensional area array of photosensitive detectors or photosites to collect light (photons) that are recorded in the image capture. The array is made up of rows and columns of photosensitive detectors, typically using a charge-coupled device (CCD) or a complementary metal oxide semiconductor (CMOS) technology to form the image. In the case of CCD technology, an array of tiny light-sensitive diodes convert photons (light) into electrons (electrical charge). In a typical setup, each element of the array contributes one pixel to the final image. Each photosensitive detector produces a charge proportional to the amount of light that impinges on the detector, i.e., the detector simply counts the number of photons. However, as each photosite only keeps track of the total intensity of the light that strikes its surface, most sensors use color filtering to look at the light in its three primary colors (red-green-blue or RGB) in order to capture a full color image.

One common type of digital cameras known as mosaic sensor or color filter array (CFA) cameras uses color filter arrays to create color images from the raw grayscale captured by the array of photosensitive detectors. In particular, each element in the array of photosensitive detectors can be covered by a color filter such that each element captures only red, green, or blue light. Many cameras apply the color filters in a Bayer pattern 44 as shown in FIG. 1. The Bayer filter pattern alternates a row of red and green filters with a row of blue and green filters such that there are as many green pixels as there are blue and red pixels combined. The colored pixels are divided in this way in order to create an image that will be perceived as true color by the human eye because the human eye is not equally sensitive to all three colors. It is noted that various other color filter patterns can be similarly employed. In addition, some cameras may use CMY (cyan-magenta-yellow) filters rather than RGB (red-green-blue) filters because CMY filters transmit more light. Still yet other cameras may add a fourth color component to the mix. Regardless of the particular color filter pattern used in the color filter array camera, each element captures only one color. For example, each red-filtered element produces a grayscale value proportional to the amount of red light reaching the corresponding sensor. Similarly, each green-filtered element produces a grayscale value proportional to the amount of green light reaching the corresponding sensor and each blue-filtered element produces a grayscale value proportional to the amount of blue light reaching the corresponding sensor.

Once the colors have been recorded, they can be added together to create the full spectrum of colors by a built-in raw converter. For example, the raw output from a color filter sensor with a Bayer filter pattern is a mosaic of separate red, green and blue pixels of differing intensity. Each pixel in the sensor image is the output of a red, green or blue sensor. Conventional digital cameras commonly have built-in raw converters to convert the grayscale raw output of the color filter array into a color image by interpolating the missing color information for each pixel from its neighbors, a process known as demosaicing. Demosaicing converts the mosaic of separate colors into an equally sized mosaic of true colors. Each colored pixel can be used more than once and the true color of a single pixel can be determined by averaging the values from the closest surrounding pixels. In addition to demosaicing, the built-in raw converter may also perform various other tasks such as white balance, colorimetric interpretation, gamma correction, noise reduction, antialiasing, amplitude correction for radial distance (or input ray angle), and/or sharpening, although different raw converters may use different algorithms for such tasks such that the same image may appear differently when processed using different raw converters. The built-in raw converter in the camera then compresses the color image using JPEG compression.

However, performing the demosaicing using the built-in raw converter in the digital camera as is conventionally done results in limited image quality. To improve the image quality, the digital camera may reorganize or rearrange and compress the raw image data and output the reorganized raw image data so that the demosaicing may be performed externally of the camera. In particular, the pixels of the raw image data may be reorganized in a manner that allows high quality compression of the reorganized raw data using the digital camera's internal JPG compression. However, various other raw configurations may also be implemented.

Accordingly, the digital cameras of an image capturing system may each be configured to output grayscale data rather than compressed, e.g., JPEG, color images, thereby shifting the color decoding process from the built-in converter in the camera to a processor separate from that involved with the capturing and recording of image data. It is noted that the processor for performing the color decoding process is generally physically located external to the camera although the camera may be configured to house such a separate processor internally.

Once the colors have been recorded in grayscale by the camera, the camera's processor may reorganize the grayscale color raw data in a modified JPEG format to compress each color component (e.g., red, green, blue) separately. Because the JPEG image data format allows high degrees of compression of color images and because 8-by-8-pixel blocks form the foundation of JPEG compression, it is generally more convenient to reorganize 8×8 sections of the Bayer color filter array 44 in which each section includes a 2×2 block with R and G in the one row and G and B in the other row, such as one highlighted in FIG. 3. FIG. 2 illustrates a suitable reorganization 46 of the grayscale raw data. As shown, the RGB grayscale data is reorganized into a 16×16 array 46. The 16×16 array is organized as a 2×2 array of 8×8 embedded color-specific arrays as shown in FIG. 2. In other words, each 8×8 embedded color-specific array contains only corresponding same-colored elements from the Bayer color filtering array. Generally stated, the raw grayscale image data is a 2N×2N array and the reorganized grayscale data output includes 4 N×N arrays where N is a factor of 8. The reorganized grayscale data output of 4 N×N arrays may be stored in a single grayscale data file or four separate grayscale data files, for example. It is noted that the FIG. 2 illustrates the reorganized pattern, i.e., one building block or section, and that the entire reorganized data file is generally composed of multiples of the reorganized pattern shown.

In the example shown in FIG. 1, the highlighted 2×2 block is positioned at row 2, column 1 within the Bayer color filter array 44. The R (red) element of the 2×2 block is repositioned or reorganized to the corresponding 8×8 embedded R array and to a corresponding position within the embedded R array, i.e., row 2, column 1 within the embedded R array. The B (blue) element and the two G (green) elements are similarly reorganized from the Bayer color filter array 44 to the reorganized array 46. After the reorganization, the reorganized grayscale RGB data is output to a separate processor for color decoding and compression.

Figure 3:
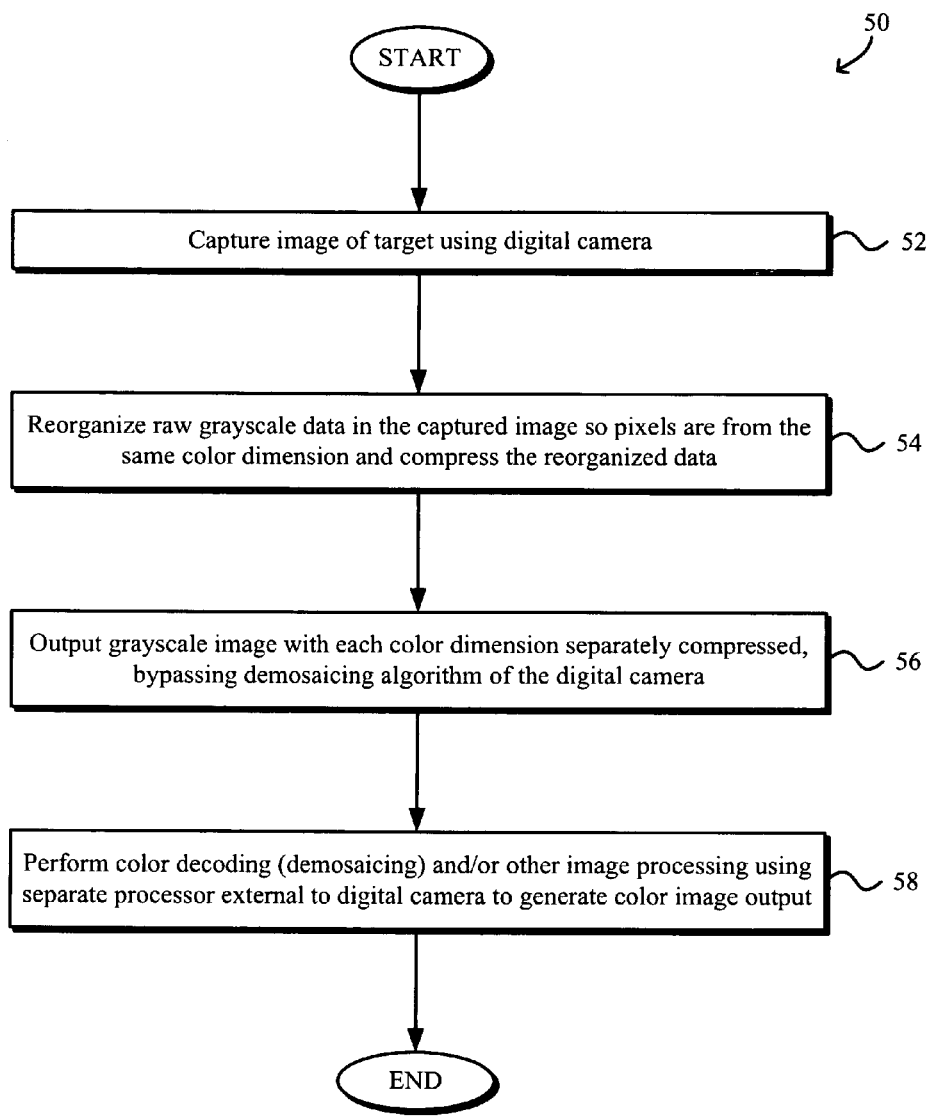
FIG. 3 is a flowchart of an exemplary process for processing of raw image data captured by the camera's sensor.

FIG. 3 is a flowchart of an exemplary process 50 for processing of raw image data captured by the camera's sensor. At block 52, an image of a target is captured using a digital camera. The image may be recorded in a raw grayscale image data file in a Bayer color filter array pattern, for example. At block 54, each color component in the raw grayscale image data file is reorganized and compressed separately to generate compressed reorganized grayscale raw data output. For example, the raw grayscale image data may be reorganized so that pixels in each 8×8 block are from the same color dimension or component. The reorganized grayscale raw data may then be compressed using JPG, for example. Typically, RGB color space is used, although various other color spaces or color representations may be employed. It is noted that although block 54 is generally performed by the internal built-in processor of the digital camera, the camera and process may alternatively be configured to output the raw grayscale image data file so that block 54 may be performed by a separate processor.

At block 56, the compressed reorganized grayscale image with each set of color components separately compressed is outputted, thereby bypassing demosaicing and/or various other image processing algorithms of the camera. At block 58, a processor separate from that performing the image data recording performs color decoding (demosaicing) and/or other image processing tasks to generate the color image output. Examples of the other image processing tasks may include, for example, white balance, colorimetric rendering, gamma correction, noise reduction, antialiasing, and/or sharpening. The image processing processor is typically physically external to the camera and may be for example, embodied in a separate computer to which the image data is off loaded.

The reorganization of grayscale RGB data according to color components improves the ability to compress images within the digital camera. In particular, outputting data in grayscale by bypassing the camera's internal demosaicing and other image processing algorithms provides greater control and flexibility over the color decoding and compression processes and thus improves the quality of the resulting output image, as the various parameters that affect the output image quality can generally be controlled and manipulated external to the camera when the grayscale file is converted to the color image.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for processing raw grayscale image data, comprising:
    compressing each color component of the raw grayscale image data separately to generate at least one reorganized grayscale data output file by a first processor, wherein the at least one reorganized grayscale data output file is in a first two-dimensional spatial array pattern that segregates each color component;
    outputting the at least one reorganized grayscale data output file to a second processor different from the first processor; and
    performing color decoding on the at least one reorganized grayscale data output file to generate a color image output by the second processor.

2. The method of claim 1, further comprising:
    capturing an image of a target using a digital camera; and
    reorganizing the raw grayscale image data of the image by the first processor, wherein the first processor is internal to the digital camera.

3. The method of claim 2, wherein the second processor is physically external to the digital camera.

4. The method of claim 1, wherein the performing further includes an image processing task selected from the group consisting of white balance, colorimetric rendering, gamma correction, noise reduction, antialiasing, and sharpening.

5. The method of claim 1, wherein the color components of the raw grayscale image data include red, green and blue.

6. The method of claim 1, wherein the at least one reorganized grayscale data output file is in a reorganized pattern of 16×16 arrays, each 16×16 array being composed of a 2×2 array of 8×8 embedded color-specific arrays.

7. The method of claim 1, wherein the raw grayscale image data is a 2N×2N array, and the at least one reorganized grayscale data output file includes 4 N×N arrays where N is a factor of 8.

8. The method of claim 7, wherein the at least one reorganized grayscale data output file includes 4 reorganized grayscale data output files, each reorganized grayscale data output file including one of the N×N arrays.

9. The method of claim 1, wherein the raw grayscale image data is in a second two-dimensional spatial array pattern, each element of raw grayscale image data being associated with a color component and corresponding to a respective element in the at least one reorganized grayscale data output file according to the color component of the element and according to its respective position within the raw grayscale image data.

10. The method of claim 1, wherein the raw grayscale image data is in a Bayer color filter array pattern.

11. A system for processing raw grayscale image data, comprising:
    a digital camera configured to capture an image of a target and having a first processor internal thereto configured to record the raw grayscale image data of the image, the first processor being further configured to compress each color component of the raw grayscale image data separately to generate at least one reorganized grayscale data output file, wherein the at least one reorganized grayscale data output file is in a first two-dimensional spatial array pattern that segregates each color component; and a second processor different from the first processor configured to perform color decoding to generate a color image output.

12. The system of claim 11, where the second processor is physically external to the digital camera.

13. The system of claim 11, wherein the second processor is further configured to perform an image processing task selected from the group consisting of white balance, calorimetric rendering, gamma correction, noise reduction, anti-aliasing, and sharpening.

14. The system of claim 11, wherein the color components of the raw grayscale image data include red, green and blue.

15. The system of claim 11, wherein the at least one reorganized grayscale data output file is in a reorganized pattern of 16×16 arrays, each 16×16 array being composed of a 2×2 array of 8×8 embedded color-specific arrays.

16. The system of claim 11, wherein the raw grayscale image data is a 2N×2N array, and the at least one reorganized grayscale data output file includes 4 N×N arrays where N is a factor of 8.

17. The system of claim 16, wherein the at least one reorganized grayscale data output file includes 4 reorganized grayscale data output files, each reorganized grayscale data output file including one of the N×N arrays.

18. The system of claim 11, wherein the raw grayscale image data is in a second two-dimensional spatial array pattern, each element of raw grayscale image data being associated with a color component and corresponding to a respective element in the at least one reorganized grayscale data output file according to the color component of the element and according to its respective position within the raw grayscale image data.

19. The system of claim 11, wherein the raw grayscale image data is a Bayer color filter array pattern.

* * * * *

UNITED STATES PATENT AND TRADEMARK OFFICE
CERTIFICATE OF CORRECTION

PATENT NO. : 7,469,059 B1
APPLICATION NO. : 11/015980
DATED : December 23, 2008
INVENTOR(S) : Francois-Marie Lefevere Page 1 of 1

It is certified that error appears in the above-identified patent and that said Letters Patent is hereby corrected as shown below:

Column 7, Claim 13, Lines 12-13;

Delete "calorimetric" and Insert --colorimetric--

Signed and Sealed this

Third Day of March, 2009

JOHN DOLL
*Acting Director of the United States Patent and Trademark Office*